United States Patent
Dotan

(10) Patent No.: US 8,484,483 B2
(45) Date of Patent: *Jul. 9, 2013

(54) METHOD FOR PROTECTING COMPUTER PROGRAMS AND DATA FROM HOSTILE CODE

(75) Inventor: Eyal Dotan, Bussy St. Georges (FR)

(73) Assignee: Trustware International Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,442

(22) Filed: Dec. 9, 2011

(65) Prior Publication Data

US 2012/0090029 A1   Apr. 12, 2012

Related U.S. Application Data

(63) Continuation of application No. 12/553,084, filed on Sep. 2, 2009, now Pat. No. 8,078,886, which is a continuation of application No. 11/141,909, filed on Jun. 2, 2005, now Pat. No. 7,613,930, which is a continuation-in-part of application No. 10/037,560, filed on Jan. 4, 2002, now Pat. No. 7,363,493.

(60) Provisional application No. 60/683,211, filed on May 23, 2005.

(51) Int. Cl.
*G06F 11/30* (2006.01)
*G06F 12/00* (2006.01)

(52) U.S. Cl.
USPC .......................................... 713/187; 707/831

(58) Field of Classification Search
USPC .......................................... 713/187; 707/831
See application file for complete search history.

(56) References Cited

U.S. PATENT DOCUMENTS

| 4,962,533 A | 10/1990 | Krueger et al. |
| 5,280,614 A | 1/1994 | Munroe et al. |
| 5,349,655 A | 9/1994 | Mann |

(Continued)

FOREIGN PATENT DOCUMENTS

| EP | 0472487 A2 | 2/1992 |
| GB | 2391650 A | 2/2004 |

(Continued)

OTHER PUBLICATIONS

Moffet J. et al., "Specifying Discretionary Access Control Policy for Distributed Systems", 8260 Computer Communications, vol. 13, No. 9, pp. 571-580 (Nov. 1, 1990).

(Continued)

*Primary Examiner* — Teshome Hailu
(74) *Attorney, Agent, or Firm* — Nixon Peabody LLP; Joseph Bach, Esq.

(57) ABSTRACT

A method that protects computer data from untrusted programs. Each computer's object and process is assigned with trust attributes, which define the way it can interact with other objects within the system. When an object is classified as untrusted, it can interact with other object within the system on a limited basis. A virtualized system is provided on the computer so that when the untrusted object attempts to perform an operation that is outside its scope of authorization, the virtualized system intercepts the operation but present the untrusted program with an indication that the requested operation has been performed. The method further includes processes to securely move a program from an untrusted group to a trusted group.

14 Claims, 8 Drawing Sheets

U.S. PATENT DOCUMENTS

| | | | |
|---|---|---|---|
| 5,361,359 A | 11/1994 | Tajalli et al. | |
| 5,398,196 A | 3/1995 | Chambers | |
| 5,408,642 A | 4/1995 | Mann | |
| 5,421,006 A | 5/1995 | Jablon et al. | |
| 5,446,903 A | 8/1995 | Abraham et al. | |
| 5,446,904 A * | 8/1995 | Belt et al. | 713/323 |
| 5,613,002 A | 3/1997 | Kephart et al. | |
| 5,859,966 A | 1/1999 | Hayman et al. | |
| 5,937,159 A | 8/1999 | Meyers et al. | |
| 5,958,050 A | 9/1999 | Griffin et al. | |
| 6,073,239 A | 6/2000 | Dotan | |
| 6,125,447 A | 9/2000 | Gong | |
| 6,173,404 B1 | 1/2001 | Colburn et al. | |
| 6,189,103 B1 | 2/2001 | Nevarez et al. | |
| 6,199,181 B1 | 3/2001 | Rechef et al. | |
| 6,275,938 B1 * | 8/2001 | Bond et al. | 726/23 |
| 6,314,409 B2 | 11/2001 | Schneck et al. | |
| 6,330,670 B1 | 12/2001 | England et al. | |
| 6,405,265 B1 * | 6/2002 | Kronenberg et al. | 719/321 |
| 6,549,521 B1 | 4/2003 | Edwards et al. | |
| 6,772,332 B1 | 8/2004 | Boebert et al. | |
| 6,839,850 B1 | 1/2005 | Campbell et al. | |
| 6,871,277 B1 | 3/2005 | Keronen | |
| 7,028,305 B2 | 4/2006 | Schaefer | |
| 7,188,367 B1 | 3/2007 | Edwards et al. | |
| 7,506,338 B2 * | 3/2009 | Alpern et al. | 717/177 |
| 7,613,930 B2 * | 11/2009 | Dotan | 713/188 |
| 8,078,886 B2 * | 12/2011 | Dotan | 713/187 |
| 2003/0159070 A1 | 8/2003 | Mayer et al. | |
| 2003/0233490 A1 | 12/2003 | Blaser et al. | |
| 2005/0149726 A1 | 7/2005 | Joshi et al. | |
| 2005/0257265 A1 | 11/2005 | Cook et al. | |

FOREIGN PATENT DOCUMENTS

| | | |
|---|---|---|
| GB | 2411748 A | 9/2005 |
| GB | 2411988 A | 9/2005 |
| WO | WO 01/92981 A2 | 12/2001 |
| WO | WO 2005/043360 A1 | 5/2005 |

OTHER PUBLICATIONS

Anonomous, "Performing Hierarchical Authorizations", IBM Technical Disclosure Bulletin, vol. 34, Issue No. 5, pp. 31-32 (Oct. 1, 1991).

Anonomous, Mechanism for Trusted Computing Base Isolation, IBM Technical Disclosure Bulletin, vol. 34, Issue No. 8, pp. 214-215 (Jan. 1992).

European Search Report EP 01 40 0161.

European Search Report EP 01 40 1170.

European Patent Application 0 472 487 A2, Monroe et al., Feb. 26, 1992.

Ian Goldberg, et al. "A Secure Environment for Untrusted Helper Applications," Internet Citation, Jul. 22, 1996, http://www.cs.berkeley.edu/daw/papers/janus-usenix96.ps.

Douglas P. Ghormley, et al. "Slic: An Extensibility System for Commodity Operating Systems," Proceedings of the Usenix Annual Technical Conference, Jun. 15, 1998, pp. 39-52.

International Search Report for PCT/IB2006/003831 dated Jul. 12, 2007.

* cited by examiner

METHOD FOR PROTECTING COMPUTER PROGRAMS AND DATA FROM HOSTILE CODE

RELATED APPLICATIONS

This application claims priority from, and is a Continuation of U.S. Ser. No. 12/553,084, filed on Sep. 2, 2009, which is a Continuation of U.S. Ser. No. 11/141,909, filed on Jun. 2, 2005, which is a Continuation in Part of, U.S. application Ser. No. 10/037,560, filed Jan. 4, 2002, and which claims priority from Provisional Application Ser. No. 60/683,211, filed May 23, 2005.

FIELD OF THE INVENTION

The invention relates to a method for protecting computer data and programs, and more generally to computer system and network security. The invention is useful for preventing data damage and theft, which can be done by malicious code attacks.

BACKGROUND

A computer in the present specification is a machine containing a processor and memory, and where the processor is able to execute instructions selected among a given set of instructions. A series of instructions for execution by the processor is called a "program" or "code." When stored in the memory of the computer, a program is referred to as "passive code." When loaded into the processor for execution, it is called a "process." Data is information that may be handled or managed in any way by a computer program; data may also be stored in the memory of the computer. A network comprises a plurality of computers connected together.

We call "malicious" or "hostile" any code designed or modified to intentionally corrupt or steal data or programs from the computer system or network on which it runs. Protecting from hostile code is a challenging problem, since there is no way to programmatically distinguish positive and negative program actions, other than knowing whether they are ultimately good for the user or not. For example, a program may delete a file because the user has explicitly asked it to, but a malicious program could also delete a file against the user's will. In other words, there is no proper technical definition of "malicious" or "hostile" code—these being defined according to the behavior expected from a computer by its legitimate user.

Although it is possible to authenticate authorized users with password, trusted users themselves may endanger the system and network's security by unknowingly running programs that contain malicious instructions such as "viruses," "Trojan horses," "malicious macros," "malicious scripts," "worms," "spying programs" and "backdoors." A computer virus is a program that replicates by attaching itself to other programs. A Trojan horse is a program that in a general way does not do what the user expects it to do, but instead performs malicious actions such as data destruction and system corruption. Macros and scripts are programs written in high-level languages, which can be interpreted and executed by applications such as word processors, in order to automate frequent tasks. Because many macro and script languages require very little or no user interaction, malicious macros and scripts are often used to introduce viruses or Trojan horses into the system without user's approval. A worm is a program that, like a virus, spreads itself. But unlike viruses, worms do not infect other host programs and instead send themselves to other users via networking means such as electronic mail. Spying programs are a subtype of Trojan horses, secretly installed on a victim computer in order to send out confidential data and passwords from that computer to the person who put them in. A backdoor is a secret functionality added to a program in order to allow its authors to crack or misuse it, or in a general way exploit the functionality for their own interest.

All of the above programs can compromise computer systems and a company's confidentiality by corrupting data, propagating from one file to another, or sending confidential data to unauthorized persons, in spite of the user's will.

Along the years, different techniques were created to protect computer systems against malicious programs:

Signature scanners detect viruses by using a pre-defined list of "known viruses." They scan each file to for each virus signatures listed in their known virus database. Each time a new virus is found anywhere in the world, it is added to that database. However, today more and more new viruses are created every day, and the known-viruses list needs to be constantly updated in order to be effective. Regularly updating an anti-virus is a heavy task for both the single-user and the network administrator and it leaves an important security gap between updates.

Another detection method, commonly called Heuristic Scanning consists of scanning programs for suspicious instructions that are typical to malicious programs and specifically viruses, without needing to have an exact signature of each virus in order to detect it in files. However, malicious program writers can avoid or hide those typical instructions by writing their code differently and/or encrypting it and thus malicious code and viruses rapidly avoid detection by Heuristic Scanners.

U.S. Pat. No. 5,408,642 and U.S. Pat. No. 5,349,655, issued to Mann and U.S. Pat. No. 5,613,002, issued to Kephart et al., all disclose methods for recovering a computer program infected with a virus. The disclosed methods include generating fingerprint of data prior to infection by a virus and storing the fingerprint. Second fingerprint of data is then generated and compared to the prior strings of data, to determine if the data has been corrupted by a virus and for restoring the data to its initial state. These techniques do not prevent viruses from infecting, nor do they protect against other types of malicious programs.

U.S. Pat. No. 6,073,239, issued to the present inventor, discloses a method where file I/O activity is filtered. Whenever a program attempts to infect or inject code into another program file, it will be denied. The method, however, is only designed to work against executable-files viruses. It does not address other types of viruses, such as macro-viruses, nor other types of malicious programs: worms, Trojan horses, backdoors or spying software, because these malicious programs do not inject code nor modify other programs, but directly trigger malicious actions such as data corruption.

U.S. Pat. No. 5,421,006, issued to Jablon et al., discloses a method for assessing integrity of computer system software at time of system initialization. Startup processes are verified before being allowed to execute. The method, however, does not prevent the protected processes from being corrupted in the first place, nor does it deal with data and programs other than those related to the system startup.

Other security methods consist of certifying programs that are authorized to run and blocking out all the other, unauthorized programs. Unfortunately, these techniques are not always adapted to open systems where users receive and exchange many files.

One common security system consists of establishing access control lists (i.e. ACL, DACL) that define restrictions and rights as to which users are allowed or not allowed to access certain resources, based on those users' rights. For example, system administrators are typically allowed to modify any files while simple users cannot read nor modify some confidential or critical files. Such security system is usually integrated in modern operating systems to ensure data security and confidentiality on a per-user basis. However, it is important to make a distinction and understand that this security scheme was designed to address the issue of user trust, not the issue of code trust. Users who run malicious programs within their systems will unknowingly compromise the integrity of every resource and file they're allowed to access with no further protection. For instance, let's say user X is granted full access to the shared files A, B and C. If this user runs a program infected with a virus, the virus will be able to read, infect or even destroy the files A, B and C. This is due to the fact that access control lists are designed so that programs and tasks run in the security contexts of the users who started them. Thus, even though the user has not meant to actually harm files A, B and C, the program he ran did harm these files despite of the user's will, yet accordingly to the user's rights. This is the heart of the malicious code problem. If a user runs hostile code, the code will be able to corrupt and steal any data within the system or network to which its user has access. And if a system administrator runs hostile code, the entire system and network are immediately compromised. Also, additionally to these security problems, access control lists are statically defined for each file and resource. In environments where files are shared and exchanged every day, this does not provide enough security against malicious code, since users usually don't take the time to assign the right security attributes for each new file they create or receive. Such systems are disclosed in EP-A-0 472 487, or in the article of Moffett J. et al, Specifying Discretionary Access Control Policy for Distributed Systems, Computer Communications vol. 13 no. 9 pp. 571-580.

"Sandboxing" techniques allow testing suspicious programs by safely running them in a secure "sandbox" environment without letting the tested program harm the system or its files. Malicious programs, however, may not perform the offensive or expected actions immediately during the test period, either because they detected that they're being tested, or because they're designed to perform their offensive actions randomly or at certain dates, for example. Hence, although a program seems to behave correctly during the test period, it can harm the system once it has passed the test and has been allowed to run for real. Also, positive programs may not behave correctly or not function at all within a sandbox, as they may need to access files and resources within the system for normal reasons.

U.S. Pat. No. 5,398,196, to Chambers, discloses a method for emulating a program's execution in a virtual process, while searching for viral behavior. The disadvantages of this method are the same as above.

SUMMARY

The invention provides a solution for protecting data and program present on a computer from hostile code. It offers protection at any stage of operation of the computer, and protects the computer from any type of hostile code. Specifically, the invention provides a process for protecting objects in a computer from hostile code, comprising the steps of:

defining at least two trust groups;
assigning objects and processes in the computer to one of said trust groups, irrespective of the rights of a user of said computer;
upon operation of a process over an object or over a second process, comparing a trust group of the process with a trust group of the object or with the trust group of the second process, and
allowing the operation according to the results of said comparing step.

In an embodiment, a process is assigned, upon it being created, to the trust group assigned to the passive code from which the process is created. One may also provide a step of changing the trust group of the process and/or of the object after said operation. One solution therefor is to assign the process to the trust group of the object or of the second process, when the operation is allowed.

The process may further comprise, upon creation of an object by a process, the step of assigning said created object to the trust group of said process.

In a preferred embodiment, trust groups are hierarchically ordered, and the step of allowing comprises:

allowing said operation when the trust group of said process is higher in said hierarchy than the trust group of said object or of said second process or equal to the trust group of said object or of said second process, and denying said operation when the trust group of said process is lower in said hierarchy than the trust group of said object or of said second process.

One may also provide a step of assigning the process to the trust group of an object or of a second process after the operation is allowed.

There may also be defined at least two types of objects, objects being assigned to one of said types; the step of allowing operation over an object may then be carried out according to the type of said object. One may also define least two types of operations; the step of allowing operation over of a process being then carried out according to the type of said process. One may also define at least two types of operations; the step of allowing operation over an object is then carried out according to the type of said operation. It is further possible to define at least two types of storage methods and assign a trust group to a type of storage methods; a storage operation for a process of a trust group may then be carried out according to the storage method assigned to the trust group of said process.

The invention further provides a computer, comprising
objects and processes;
a table of at least two trust groups, objects and processes in the computer being assigned to one of said trust groups irrespective of the rights of a user of said computer;
a controller accessing said table and allowing an operation of a process over an object or over a second process according to the results of a comparison of the trust group of said process and the trust group of said object or of said second process.

The computer may further comprise a table of types of at least two types of objects, objects in the computer being assigned one type; in this instance, the controller accesses said table for allowing an operation. The table of trust groups is preferably stored in a non-volatile memory, as well as the table of types is stored in a non-volatile memory.

The computer may also comprise a table of rules; the controller then accesses the table of rules for allowing said operation. It is advantageous that the table of rules is stored in a non-volatile memory.

Last, the invention provides a computer network, comprising a server and at least one such computer; the table of trust groups is then stored in said server. It also provides a computer network, comprising a server and at least one such computer, the table of types is then stored in said server. It last comprises a computer network, comprising a server and at least one such computer; the table of rules is then stored in the server.

BRIEF DESCRIPTION OF THE DRAWINGS

Other features and advantages of the invention will appear from the following description, where.

DETAILED DESCRIPTION

The invention is based on the recognition that the action of hostile programs in spite of the user's will is due to the fact that programs run with the same access privileges as the users who executed them. Thus, any object that is accessible to the user, is also accessible to the programs he runs—and may therefore be accessed by a hostile program in case the user inadvertently or intentionally runs such a program.

The invention thus suggests defining trust groups, and assigning objects in a computer to one of the trust groups. Any operation of a process over an object is then allowed or denied according to the results of the comparison of the trusts groups of the process and of the object upon which the process operates.

The method of the invention is different from all prior art methods discussed above. There is no need to scan files or programs to detect known signatures; the process operates independently from the user. Instead of assigning rights to the user and allowing any action of the user, the invention assigns trust values to the programs and objects in the computer.

Figure 1:
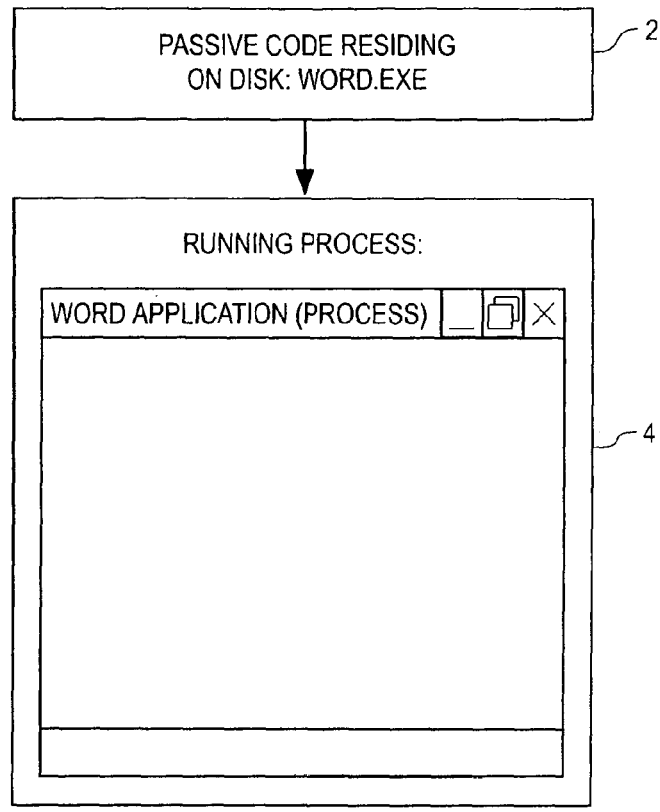
FIG. 1 shows diagrammatically passive code and a process.

In a computer, we call "code" or "program" any set of instructions that can be interpreted or executed by the processor of the computer. When code is passively stored on a storage media without being executed, we call it "passive code." When code is actively running in memory, it is a "process." The mechanism of loading a program from the storage media where it resides as passive code, into memory (e.g. RAM) where it runs as an active process, is called "execution." FIG. 1 illustrates an example of code execution mechanism: here, a file 2 called "WORD.EXE" represents passive code. This file is stored in a storage device of the computer, such as a hard disk. When the computer instructs to execute it, the Operating System (OS) copies an image of this file into memory (RAM) and runs it from there. At this stage, "WORD" is a process 46, since it is now running. Note that although the file "WORD.EXE" and the process "WORD" that is in memory may have similar contents (because one is initially copied from the other), they are two different entities: each can be modified without affecting the other. Additionally, the computer user can execute "WORD.EXE" several times and have several different "WORD" processes running at the same time, but separately. Furthermore, processes can execute passive codes and hence create other processes. If a process A creates a process B, process A is called the "parent process" and process B is called a "child process.".

We call "object" any file, passive code, document, script, macro, process, registry key or other system object that needs to be protected by the present invention, or that contains Code that can be interpreted by the OS or any Process. An object containing Code is preferably protected, since it may be executed, and may therefore be used for hostile purposes.

Processes and objects being defined, the process suggest defining trust groups, and assigning objects and processes to one of the trust groups. A trust group is thus a set of processes and objects. The way objects and processes are assigned to the trust groups is discussed below; and it should only be noted that the trust groups are independent of the rights of the user of the computer. In other words, trust groups are different from the rights defined in the prior art.

For the sake of convenience, trust groups may simply be represented by a trust value common to all elements of the group. This value may be represented as a number, or by any other representation. In the simplest instance, two groups are defined. The groups could then be represented by 0 and 1—where one of these values means "trusted" and the other one means "untrusted". As exemplified below, trust values could also be a number from 0 to 10. This may allow up to 11 trust groups to be defined. For determining objects and processes to one of the trust groups, one may use a trust table, representative of the trust group of each process or object assigned to one of the trust groups. There may be provided two tables, for storing separately trust groups for objects and processes. Indeed, it is advantageous that the trust table for the objects be recorded on a non-volatile storage device, e.g. a hard disk or a remote server; on the other hand, since processes are essentially active in RAM only, a trust table for processes may be stored in the RAM.

Objects and processes being thus assigned to trust groups, any operation of a process over an object—e.g. for modifying or deleting an existing object—causes the trust group of the process to be compared to the trust group of the object. The operation may then be allowed or not allowed according to the results of the comparing step.

The process disclosed above protects objects in the computer from hostile code. Assume for instance two groups are defined, one containing "trusted" objects and processes, the other one containing "untrusted" objects and processes. As explained below, trusted objects and processes could be considered not hostile, e.g. commercial code and the like. One would allow or not allow an operation of a process upon an object depending on the trust group. For instance, in the simplest embodiment, the only prohibited operations would be the operations of an "untrusted" process over a "trusted" object. This embodiment is crude, and it still makes it possible to restrict the operation of the computer so that there is no risk of hostile code interacting with the computer. Indeed, such code would be assigned to the "untrusted" group—since its origin may not be identified. As compared to the prior art system of rights, this process also protects the computer from actions of the user. Since processes and objects are assigned to the trust groups irrespective of the user, the user may not endanger the computer, even if he has high level rights.

As briefly explained above, one may start by assigning objects to various trust groups. Objects may be assigned to the trust groups according to the confidence given to these objects. For instance, software purchased from a computer vendor would normally be more trusted than software downloaded from unknown Internet Web or FTP sites. Software copied at the installation of a computer may also be considered as trustful, and may be assigned to a trust group accordingly. Objects installed later would be assigned to a trust group representative of a lower trust. Assigning objects to trust group may be carried out by a computer supervisor. This supervisor is the person who is in charge of the computer's security. In a networked environment, this is usually the network administrator. In single-user environments, this can be the machine user.

Figure 2:
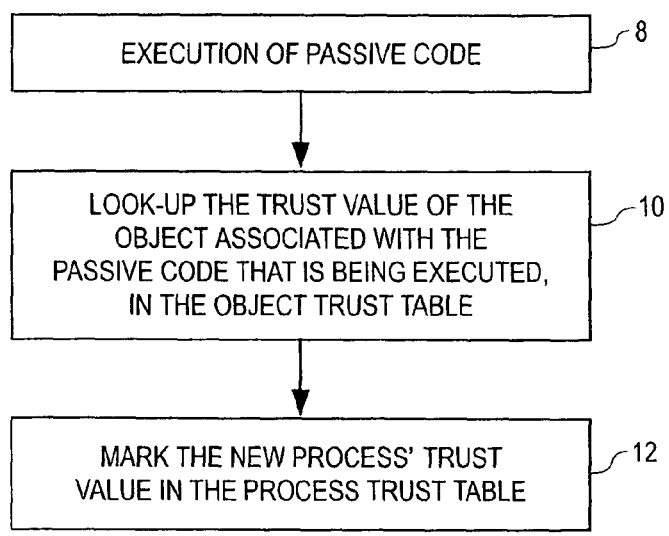
FIG. 2 is a flowchart of a process for assigning processes to a trust group.

The same method may be used for assigning processes to trust group. It is, however, clear that this is likely to be time-consuming and not very effective. FIG. 2 therefore shows a flowchart for assigning processes to a trust group. As discussed above, processes are created from passive code. One solution for assigning a process to a trust group is therefore to assign this process to the trust group assigned to the passive code starting from which the process is created. This is shown in FIG. 2 in the embodiment where trust groups are defined in an object trust table and in a process trust table. In step 8, passive code is executed, thus creating a process in RAM. In step 10, the object trust table is consulted for determining the trust group to which the passive code is assigned. In step 12, the process is assigned to the same trust group. This is marked in the process trust table. The process of FIG. 2 makes it possible to assign simply and rapidly processes to a given trust group.

Figure 3:
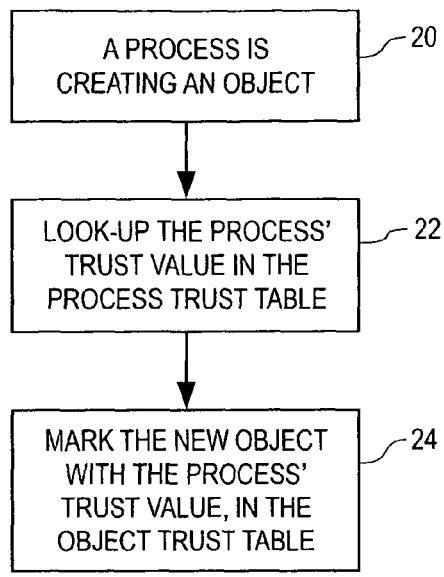
FIG. 3 is a flowchart of a process for assigning new objects to a trust group.

FIG. 3 shows a flowchart for assigning new objects to a trust group. Briefly, a new object is assigned to the same trust group as the process that created it. In step 20, an existing process, assigned to a given trust group, creates a new object. In the next step 22, the process trust table is consulted for determining the trust group to which the process is assigned. In step 24, the new object is assigned to the same trust group. This is marked in the object trust table. The method of FIG. 3 makes it possible to assign simply and rapidly new objects to a given trust group. It may not be carried out in every instance. Thus, this method could be carried out under normal use of the computer. Another method would be carried out when new objects are installed on the computer. One may also allow the supervisor only to use a method different from the one of FIG. 3 for assigning objects to trust groups. Again, this is different from the prior methods, since the objects are assigned to a trust group, regardless of whoever the user of the computer is. In other words, once an object is assigned to a trust group, this assignment of the object applies for any future user, be it the supervisor or another user.

In one specific embodiment of the invention, one may refine the rules for allowing operations. As discussed above, operation of a process over an object may be allowed on the sole basis of the comparison of the trust groups. One may also define different types of objects, operations or processes. An operation would then be allowed or carried out taking into account the type of object, operation, process or storage method. For objects, one could for instance distinguish between passive code and other objects, and allow different operations according to the type of objects. This allows providing further protection to certain types of objects. For processes, one could distinguish between processes according to user-defined process types. For operations, one could distinguish between opening, reading, creating, modifying or deleting. Again, this makes it possible to makes some operations—e.g. those deemed to be more risky—more difficult to carry out than others. One could also define different storage methods—e.g. using encryption and/or compression—and assign a trust group to a given storage method. In this case, a process in a trust group would use the storage method to which its trust group is assigned. This makes it possible to use various storage methods according to the level of confidence granted to the processes. One could thus protect trusted information—information created by a trusted process—by encrypting it.

So far, the description protects a computer against hostile code. It may however interfere too much with the operation of the computer—it being understood that any protection against hostile code will interfere with the operation of the computer, and will limit the scope of allowed operation. A more flexible example is now described. In this example, trust groups may be changed, for processes and/or for objects, in case an operation is allowed. This makes it possible to broaden the scope of operations, while still protecting the computer. Alternatively, it may improve the protection of the computer. An example is given in the case of two trust groups. The rules for allowing operations could then comprise the following rules:

allow operation of a process assigned to the "trusted" group over an object of this group;

allow operation of a process assigned to the "trusted" group over an object of the "untrusted" group, and assign the process to the "untrusted" group thereafter, with other rules being defined for the other cases. Assume for instance the process is the WORD process discussed above. Assume also that this process is in the "trusted" group. The WORD process may access a trusted object, e.g. a trusted file. When the WORD process accesses some untrusted object, e.g. a new file downloaded from an Internet server, the operation is allowed. However, the process then passes from the trusted group to the untrusted group. This ensures that the process, which may have been corrupted by the untrusted object, will not contaminate objects in the trusted group. The number of possible operations is increased, while still protecting the computer; the protection is also improved.

All features discussed above were discussed separately, for the sake of clarity, one should understand that these features, or some of them only may be combined.

Figure 4:
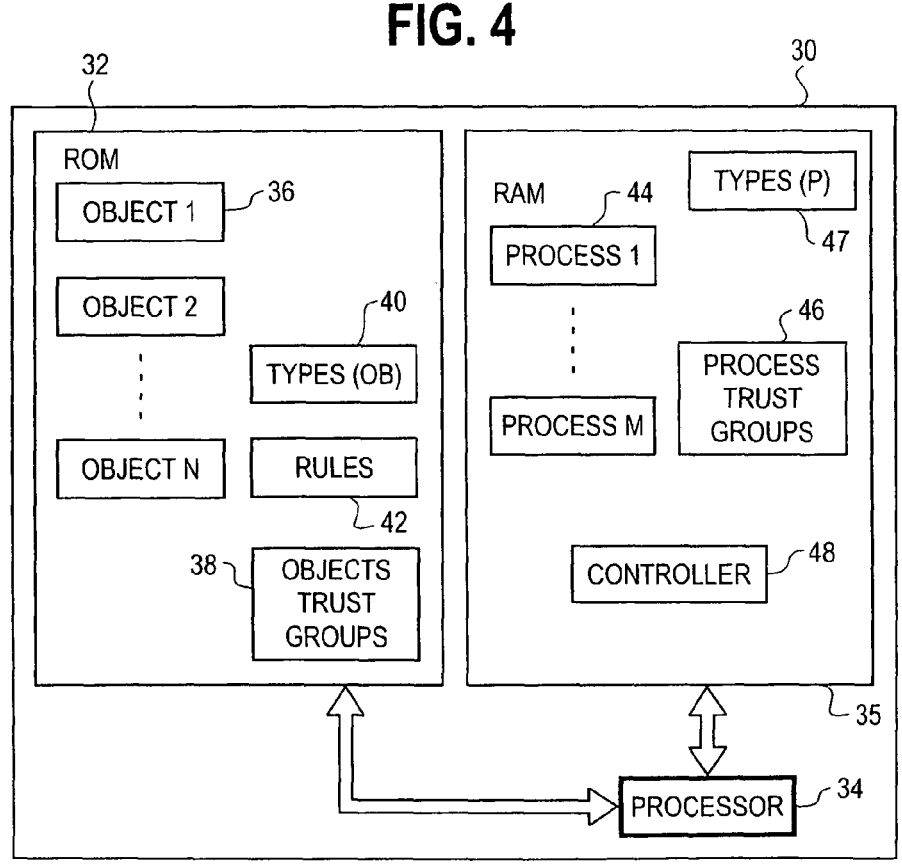
FIG. 4 is a schematic view of a computer where the process is embodied.

FIG. 4 is a schematic view of a computer where the invention is carried out. The computer 30 comprises non-volatile memory 32, e.g. a hard drive, a floppy disk, or the like. It has a processor 34 with associated RAM 35. The processor 34 is connected and accesses both non-volatile memory 32 and RAM 35. Memory 32 contains a number of objects 36, as well as a table 38 of objects trust groups. There is also provided in memory 32 a table 40 of types for the objects, as well as a table 42 of rules. RAM 34 contains a number of active processes 44, a table 46 of processes trust groups, as well as a table 47 of types of processes. In addition, there is provided in RAM 32 a controller 48 for accessing the tables of trust groups when a process is operating over an object. The controller allows the operation according to the results of a comparison of the trust group of the process and of the trust group of the object. This controller may be designed to work at the OS-level, and may be implemented in a Driver, VxD or TSR, depending on the OS type.

We now provide an example of another embodiment of the invention, where trust groups are hierarchically ordered. Such an order makes it simpler to devise rules for allowing or denying operations, upon comparison of trust groups. Trust groups may then simply be referred to as a trust value associated with the group. The words "trust groups" and "trust value" are used interchangeably in the rest of this specification. The order of the trust groups may for instance be selected as follows: the higher an object's trust value is, the less accessible and more protected it will be, and vice versa. In the example, the trust value is a number from 0 to 10. The objects of a new machine have a high trust value. A computer's trust regresses with time, as new software and files are executed and opened on it. Thus, the computer supervisor will typically set all objects to a high trust value upon installation of a new machine. Any object installed or introduced later into the computer, will have by default a low trust value, unless the supervisor explicitly specifies otherwise (e.g. when installing a new commercial software).

Object Trust Table

Thus, each system's object is initially provided with a supervisor-defined trust value. All of the objects' trust values are recorded in a "Object Trust Table," stored on a storage media such as a hard disk or a database server. Any object that is added to the system will obviously not be listed in the Object Trust Table as it was set initially, and thus all objects that are not stored in the Object Trust Table are automatically considered with a low trust value by default. For example, when the machine is in its original clean state, the supervisor can mark trusted objects with a high trust value. Any objects received from the outside after that moment will automatically be assigned with a low trust value, unless the supervisor specifies otherwise.

Process Trust Table

Processes, just like objects, are assigned with trust values. As discussed above, Process trust also regresses with time. Indeed, trusted processes that load or interpret code can be manipulated into performing malicious actions themselves. For example, a Process that is initially in a trusted state can become hostile in its turn if it opens a file with macros that instruct it to spy or destroy data. Processes trust values will be stored in a second table called "Process Trust Table." This table is stored in a storage media such as RAM (Random Access Memory), and can be emptied every time the OS loads-up or restarts, since at that point there are no Processes running. When a Process is created during the phase of execution, it obtains the same trust value as the Passive Code from which it was loaded. For example, if the Passive Code "WORD.EXE" was marked with a trust value of 10, then whenever WORD.EXE is executed, the resulting new Process "WORD" will be initialized with a trust value of 10, too. FIG. 2 shows how a Process obtains a trust value that depends on the object from which it was loaded.

Creation/Modification of an Object

As explained above in reference to FIG. 3, when a Process creates a new object, this object obtains the same trust attributes as that Process. When a process modifies the contents of an existing object—upon which it is allowed to operate—the object's trust group is amended to the trust group of the process. This makes it possible to take into consideration possible contamination of an object by a process.

Interaction between Processes and Objects

Figure 5:
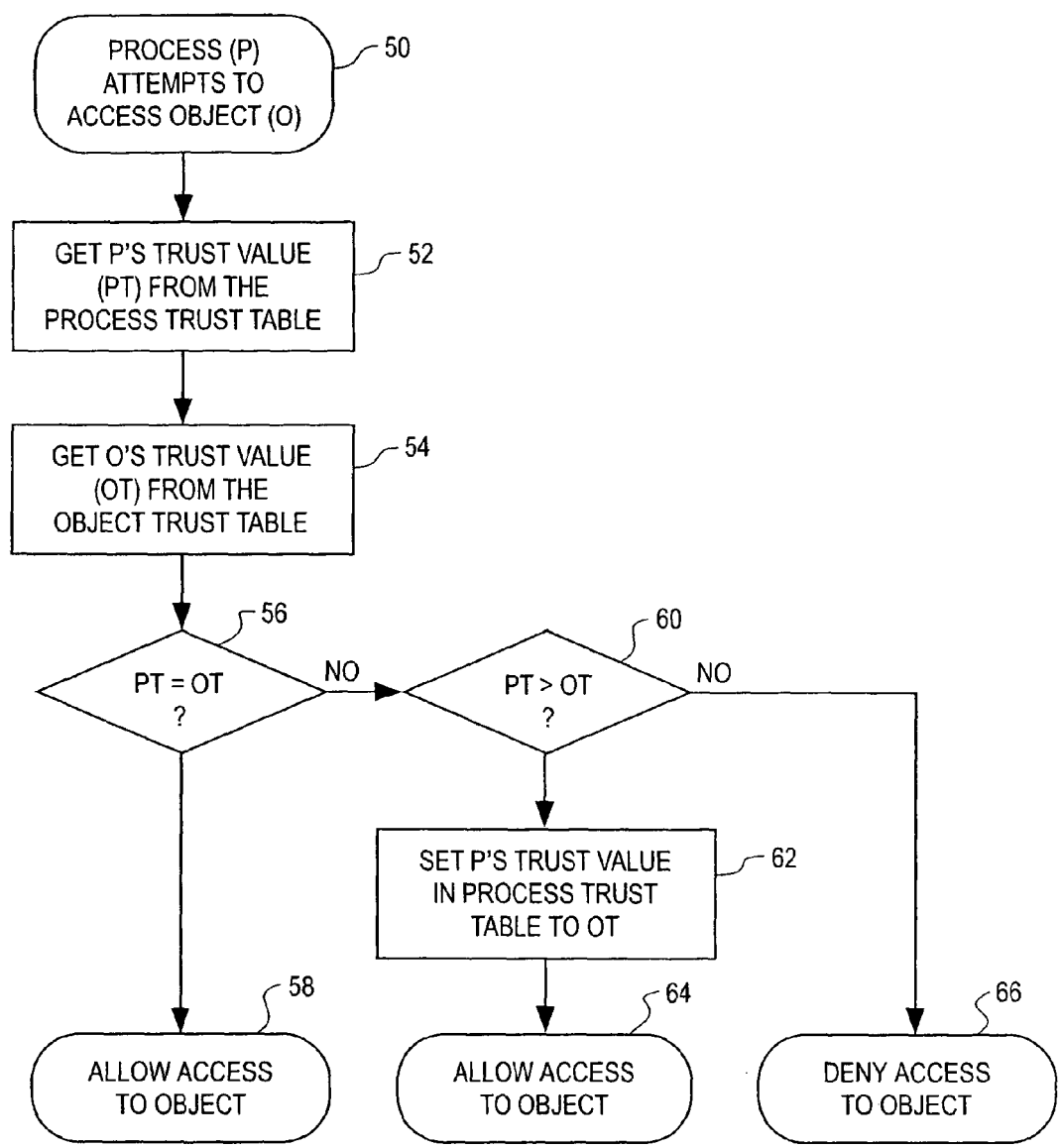
FIG. 5 is a flowchart of a process according to the invention.

FIG. 5 shows a flowchart of the process in the present example. Processes can access objects having the same trust value as themselves. In other words, a Process whose trust value is 5 can access an object whose trust value is 5. However, Processes cannot access objects having trust values higher than themselves. For example, a Process whose trust value is 5 cannot access an object whose trust value is 10.

When a Trusted Process accesses an object with a lower trust value, the trust value of this Process itself is immediately changed in the Process Trust Table and becomes as low as the accessed object's, and this remains until the Process is terminated. That way, the next time this Process attempts to access an object, it will be less privileged than before it accessed the untrusted object. For example, a Process with a trust value of 10 is allowed to access objects whose trust value is 10. But if it opens an object whose trust value is 9, the Process' trust value will be lowered to 9 and from that point on it will not be allowed to access objects with trust values higher than 9, and this until the process is terminated or restarted. This takes into consideration the fact that a process accessing an object may be contaminated by the object. Lowering the trust value of the process avoids trusted objects from being contaminated.

FIG. 5 illustrates the way interaction is done between Processes and objects. In step 50, a Process (P) attempts to access an object (R). In step 52, we look-up through the Process Trust Table, looking for the entry matching Process P. We store the result in PT. In step 54, we look-up through the Object Trust Table, looking for the entry matching object R. We store the result in RT. In step 56, PT is compared with RT. If both trust values are equal, access is allowed in step 58. Back to step 56, if PT and RT were not equal, we test in step 60 if the Process' trust value is higher than the object's. If this is the case, in step 62, the entry for the Process in the Process Trust Table is set to RT and we proceed to step 64 where access to the object is allowed. Note that the next time Process P attempts to access an object, it will go through the same decision-making except that its trust value will be different, as it was changed in step 62. Going back to step 60, if the Process' trust value is lower than the object's, then we proceed to step 66 where access to the object is denied.

Specific Example of the Invention

The following tables provide specific examples of the process in different scenarios.

TABLE 1

| Order | Actions Performed by the System | Operations performed by the controller | Process Trust Value |
|---|---|---|---|
| 1 | Execution of WORD.EXE whose trust value is 10. | Mark the newly-created Process with the same trust value as WORD.EXE: 10 | 10 |
| 2 | WORD Process opens object INFO.DOC whose trust value is 10. | Allow | 10 |
| 3 | WORD Process creates a new object: NEWFILE.DOC | Mark the newly-created object with the same trust value as the Process': 10. | 10 |
| 4 | WORD Process opens object MACRO.DOC, whose trust value is 5. | Change WORD Process' trust value in the Process Trust Table to 5 and Allow access to the object. | 5 |
| 5 | WORD Process attempts to open object INFO.DOC, whose trust value is 10. | Deny access to the object. | 5 |
| 6 | WORD Process creates a new object: NEW FILE2.DOC. | Mark the newly-created object with the same trust value as the Process': 5. | 5 |

The example of Table 1 shows rules for allowing the operation of the process over the object, as discussed in reference to FIG. 5.

TABLE 2

| Order | Actions Performed by the System | Operations Performed by the Invention | Process Trust Value |
|---|---|---|---|
| 1 | Execution of an object whose trust value is 1: VIRUS.EXE | Mark the newly-created Process with the same trust value as VIRUS.EXE: 1 | 1 |
| 2 | VIRUS Process Attempts to access object C:\WINDOWS.EXE whose trust value is 10. | Deny access to the object. | 1 |
| 3 | VIRUS Process creates a new object: PAYLOAD.EXE | Mark the newly-created object with the same trust value as the Process': 1. | 1 |

The example of Table 2 evidences that a low trust process or object may not contaminate of harm a process having a higher trust value. In the example of a virus, the virus cannot propagate through the Windows object.

Thus, with the method presented so far we have secured the computer, while still allowing a number of operations. We now describe another embodiment variant of this method, which is more flexible and faster.

Trust Groups

In addition to providing each object with a trust value, e.g. by defining trust groups, additional information and behavior is defined for objects and processes in the groups. Each object and process is linked to a "Trust Group," using a Trust Group identifier. The following table is an example of Process Trust Table where each process, identified by an OS-provided process ID (PID), is linked to a Trust Group with a Trust Group identifier.

TABLE 3

| SYSTEM-DEFINED PID | 100 | 110 | 120 | 130 | 140 |
|---|---|---|---|---|---|
| TRUST GROUP ID | 1 | 1 | 2 | 1 | 3 |

Trust Group definitions may be recorded in a central table called "Trust Groups Table," recorded on a central storage media (e.g. file server, hard-drive or non-volatile memory). Each Trust Group may have a data structure shown in the following table.

TABLE 4

Trust Group (TG)

ID: Trust Group Id
TV: trust value
FromLower: Rules list
ToLower: Rules list

ID is an index value, recorded in the Object Trust Table and the Process Trust Table, which identifies the Trust Group to which objects and Processes belong. TV is the group's trust value. FromLower is a list of rules to be applied when requests are made by processes whose Trust Group's trust value is lower than TV, targeted at objects belonging to TG. ToLower is a list of rules to be applied when a process belonging to group TG is making requests on objects whose trust values are lower than TV. The following tables are an example of Trust Group definitions, with three different trust groups.

TABLE 5

Trust Group 1

ID: 1
TV: 8
FromLower rules: A
ToLower rules: B

TABLE 6

Trust Group 2

ID: 2
TV: 5
FromLower rules: C
ToLower rules: D

TABLE 7

Trust Group 3

ID: 3
TV: 10
FromLower rules: E
ToLower rules: F

A "rules list" links several rule nodes together. Each rule node is formed as shown in Table 8.

TABLE 8

Rule (R)

OP: Operations
TO: Target object types
A: Action to perform

OP indicates what kind of I/O operations this rule applies for. For example, OP can be: Open, Read, or Write. TO is the type of objects for which this rule applies. It can be, for example: executable files, document files and registry keys. Objects can also be applied to functions that need to be limited to Processes with certain trust groups. For example, indicating "networking API" as an object type forbids use of networking operations to untrusted Processes. A is the action to perform when OP and TO match a request. It can be for example: "Deny," "Allow," "Set requesting process' trust to target object's" and/or "Set target object's trust to process." These last two actions allow for dynamically changing a process or an object's trust groups, according to its interaction with other processes and objects. Table 9 shows an example of several rules lists.

TABLE 9

| | Rules A | Rules B | Rules C | Rules D | Rules E | Rules F |
|---|---|---|---|---|---|---|
| | Rule #1 | Rule #1 | Rule #1 | Rule #1 | Rule #1 | Rule #1 |
| OP: | Read, Write | Read | Open | Open | Write | Open |
| OT: | Registry Keys | Documents | Registry keys | Image files | Any file | Text files |
| A: | Deny | Deny | Deny | Allow | Deny | Allow |
| | Rule #2 | Rule #2 | Rule #2 | Rule #2 | Rule #2 | Rule #2 |
| OP: | Open | Open | Read | Open | Read | Open |
| OT: | Images | Executables | Executables | Any file | Documents | Any file |
| A: | Deny | Deny | Allow | Deny | Deny | Deny |
| | ... | ... | ... | ... | ... | ... |

Figure 6:
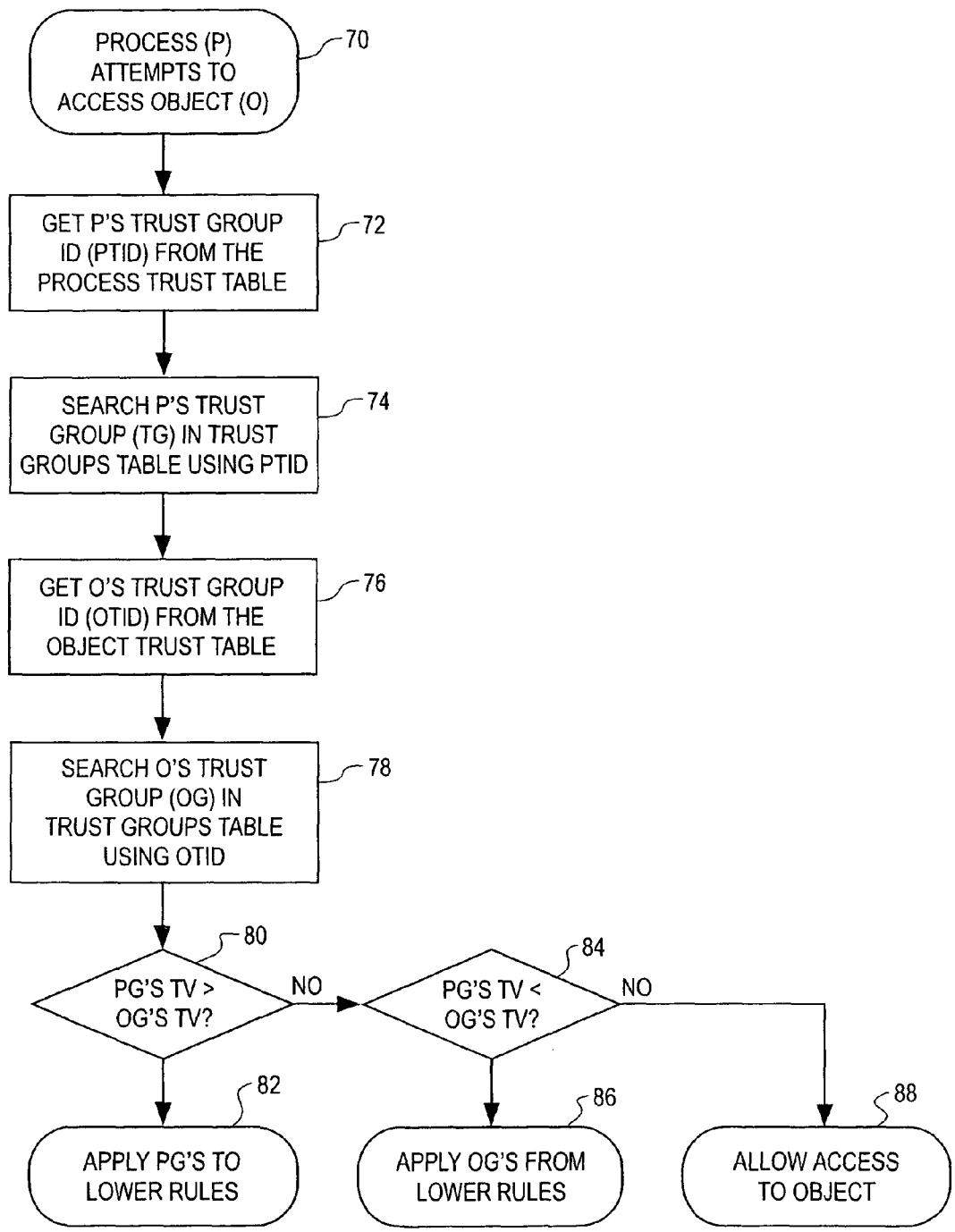
FIG. 6 is a flowchart of an operation of a process over an object.

Let us now see how this new implementation works. FIG. 6 illustrates a flowchart in which a process (P) attempts to access an object (O), as shown in step 70. In step 72, we look-up through the Process Trust Table, looking for the entry matching Process P. On most operating systems, the process can be identified by its process ID (PID). The Trust Group ID associated with the process is stored in PTID. In step 74, we look-up through the Trust Groups Table, looking for the trust group whose ID matches PTID. In steps 76 and 78, we repeat the same operations for the object that the process is attempting to access. In step 76 we look for the object's Trust Group ID within the Object Trust Table and store it in OTID. In step 78 we look-up the Trust Groups Table for the Trust Group whose ID matches OTID. In step 80, we compare the trust value fields of the process' Trust Group to that of the object's Trust Group. If the process' trust group has a higher trust value, we proceed to step 82, where we apply the rules from the process' trust group ToLower field. Back to step 80, if the process' trust group did not have a higher trust value than the object's, we proceed to step 84, where we test if the process' trust group has a lower trust value. If that is the case, we proceed to step 86, where we apply the rules from the target object's FromLower field. Back to step 84, if the process' trust group and the object's trust group had equal trust value fields, then access is allowed to the object in step 88.

Figure 7:
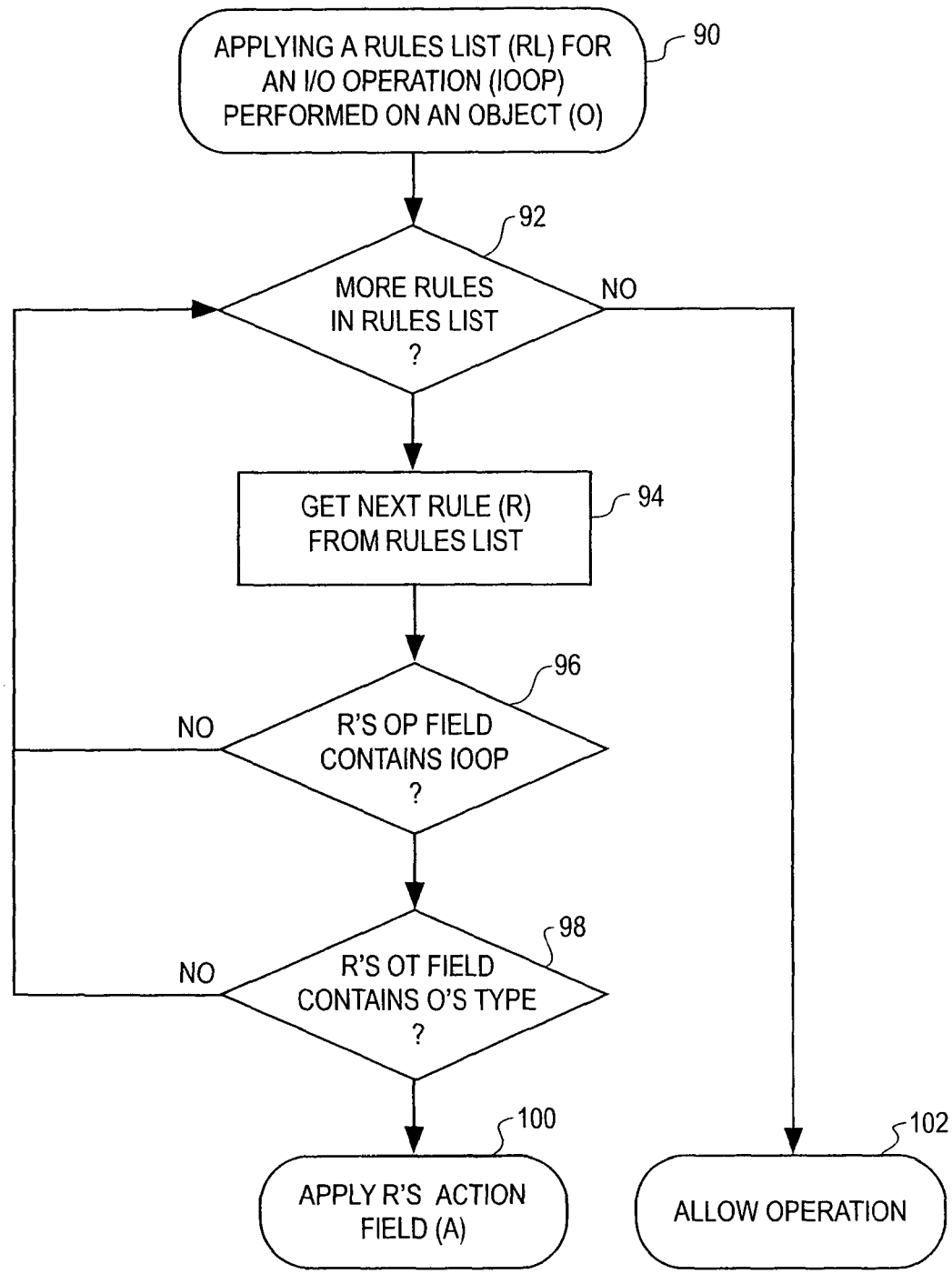
FIG. 7 is a flowchart of the application of a rule.

FIG. 7 shows how a rule is applied from a trust group's rules list field. In step 90, we refer to the rules list that needs to be applied. In IOOP, we have the operation that is requested on the target object (O). Steps 92 to 98 are executed in a loop, for each rule node in the rules list. In step 96, we test if the current rule's OP field contains the requested operation IOOP. Such test can be done using a bit combination for example, where each possible operation is represented by a bit, and the whole number represents the total set of operations. If the test is not positive, we proceed to the next rule in step 92. Similarly, in step 98 we test if the current rule's TO field contains the type of object O. The object's type can be for example: executable file, document file, registry key etc. If this is not the case, we proceed to the next rule in step 92. If both conditions were true, the process is finished in step 100, where the action to be applied is obtained from the rule node's Action field. If no rule was found that matches the required conditions, the process is finished in step 102, where the operation is by default allowed.

To enhance flexibility further, rule nodes can also have a "rules priority" field. This allows resolving tests between two different trust groups having the same trust values: the group whose rules priority is higher, will be obeyed to. This can also help with special cases where the rules of the trust group with the lowest trust value needs to be applied instead of that of the trust group with the highest trust value, as was shown in FIG. 7.

Hence, it is now possible to establish a secure environment in which several Trust Groups protect different objects with different security attributes. The invention is designed to work at the OS-level, filtering I/O operations. This is usually implemented in a Driver, VxD or TSR, depending on the OS type.

The examples given above may be changed. Trust Groups can be pre-defined and/or configurable. The process may apply to I/O operations as well as API function calls or any program-triggered action that may endanger the system.

Figure 8:
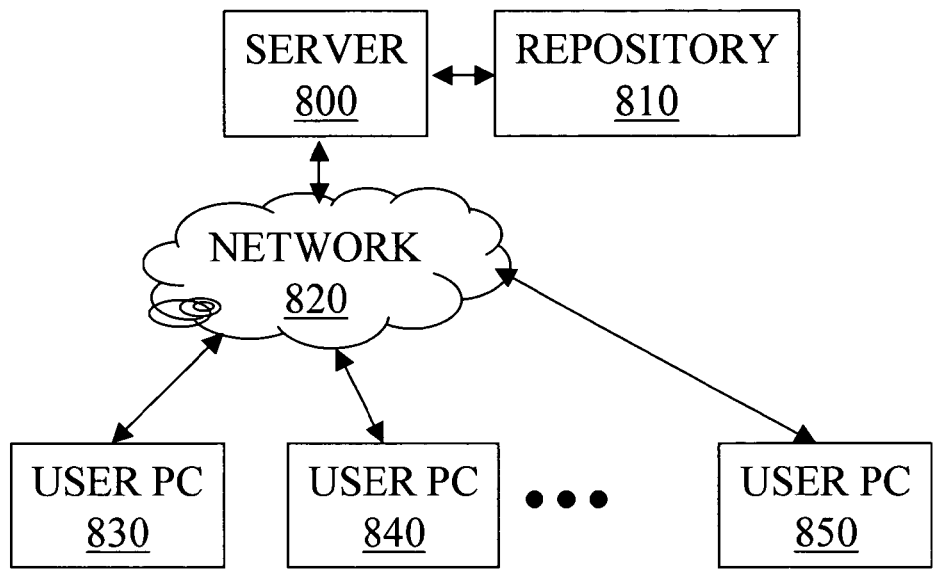
FIG. 8 depicts an embodiment wherein a server communicates with repository and a network.

FIG. 8 depicts an embodiment wherein server 800 communicates with repository 810 and a network 820. Network 820 may be an intranet, an internet, etc. Various users' computers, e.g., user PC 830-850, are also connected to the network 820. Server 800 can execute various operations according to embodiments of the present invention. Similarly, some or all of the users' computers may execute operations according to various embodiments of the present invention. Each of the users' computers may store therein objects that may be assigned a trust value, e.g., trusted or untrusted. When a computer stores objects having various trust values, all such object may be stored in the same medium, e.g., the same hard drive, regardless of trust value.

Figure 9:
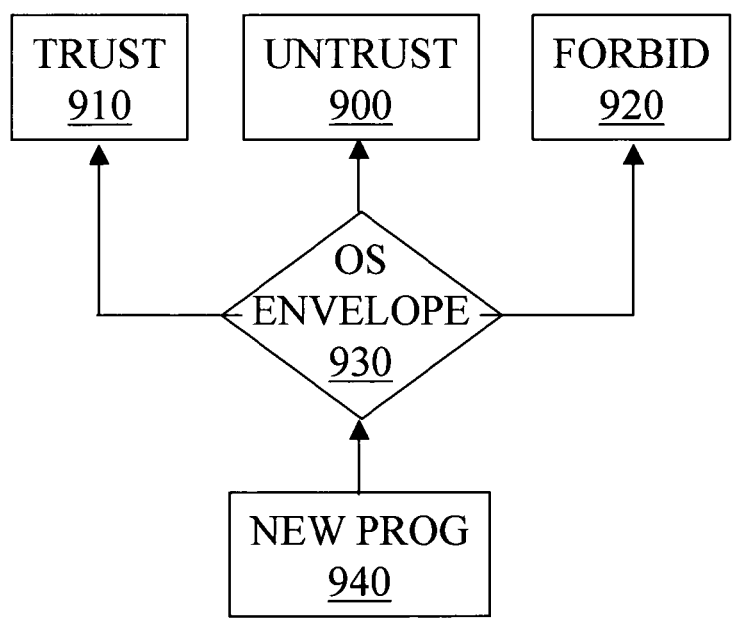
FIG. 9 illustrates each of the user computers equipped according to embodiments of the invention, including an operating system envelop.

As shown in FIG. 9, each of the users computers equipped according to embodiments of the invention includes an operating system envelope, OS Envelope 930. When a new program is introduced to the computer, and prior to any part of the program reaching the operating system, the OS envelope 930 performs a check to determine whether the new program should be classified as trusted (Trust 910), forbidden (Forbid 920), or untrusted (Untrust 900). In other words, the OS envelops intercepts all requests directed to the operating system and determines whether such a request should be forwarded to the operating system, or whether a check should be made for classifying the request as trusted, untrusted, or forbidden.

According to one embodiment of the invention, when a new program is intercepted, the users' computers perform a check to determine whether the intercepted new program has been certified by at least one recognized authority. Such a certifying authority can be, for example, a certifying company such as Verisign, authenticating the origin of a software, a software company such as Microsoft, etc. As is known, when such a certifying authority certifies a program, it embeds in the program a machine-recognizable indication that the program has been certified and an indication of the certifying authority. Therefore, when the OS envelope intercepts a new program, it checks to see whether the program includes the certificate and, if so, it classifies the program as trusted and allows the program to install, run, and use all available resources.

According to another embodiment of the invention, each of the users' computers includes a list of forbidden programs, called black list. When the OS envelope intercepts a new program, it performs a check to determine whether the intercepted new program is one of the programs listed on the forbidden programs list. If so, the OS envelope classifies the new program as forbidden.

According to another embodiment of the invention, when the OS envelope determines that the new program cannot be classified as trusted or forbidden, the program is classified as untrusted. According to this embodiment, when a program is classified as untrusted, it is allowed to run on the computer on a limited basis. In one example, an untrusted program is not allowed to access the network 820, and is prevented from changing any program or document that has been previously classified as trusted.

According to another embodiment of the invention, when a new program is installed on a user computer, a copy of the program is stored in the repository 810. The program is then allowed to run on the user's computer on a limited, i.e., untrusted, mode. If at a later time it was determined that the program can be trusted and a user attempts to change the designation of the untrusted program so as to run the program on an unlimited, i.e., trusted mode, the program is deleted from the user's computer and a new copy of the program is installed from the repository 810. This is done so as to avoid having a modified untrusted program classified as trusted. That is, as can be understood, an untrusted program cannot change a trusted program, but an untrusted program can change another untrusted program. So, when program A is classified as untrusted and is allowed to run on the computer, it can be later modified by another untrusted program B. However, the user may not know that program A was modified by program B, and may try to change the designation of program A to be trusted based on its characteristics before the change. If that happens, there is the risk of a user designating an infected/modified program A as being trusted. To avoid that, when the user tries to change the designation to trusted, the original copy of program A is used as the trusted program A.

According to another embodiment, server 800 has a client control program installed thereon, and users PC 830-850 have OS envelope 930 installed thereon. Whenever the OS envelope 930 intercepts a new program, it performs an analysis to determine whether the program is trusted and should be allowed to run on the computer on an unlimited, trusted, mode. If the results of the analysis show the program to be trusted, the OS envelope allows the program to install in a trusted mode. On the other hand, if the analysis is inconclusive, the OS envelope sends the analysis to the server 800 via the network 820, so that the client control program can perform an integrity test to verify whether the program is trusted and should be allowed to install and run on the user computer. If the client control program determines that the program is trusted, it instructs the OS envelope to install the program on the user computer.

For example, each of users' computers 830-850 may not have adequate virus detection program, or may not have updated its virus detection program. Server 800, on the other hand, is run by information technology specialists who may have several fully updated virus detection programs installed on the server and that are always kept up to date. Therefore, when any of the OS envelopes intercepts a new program, it can send a notice to the client control program on the server 800, and the server 800 may perform a virus check on the new program, using the virus detection programs installed on the server 800. If the result is negative, i.e., no virus is detected, the client control program notifies the OS envelope that no virus was detected in the new program.

As explained above, when the OS envelope intercepts an I/O request from an Untrusted programs, it determines if the operation should be allowed or denied. However, as can be appreciated, when the OS envelope denies the operation, some applications may generate an error and terminate unexpectedly. In order to allow these programs to run as expected and yet keep the system secured, embodiments of the present invention provide a method which virtualizes access to some protected resources. The novel virtualization according to embodiments of the present invention consists of making the unsafe program "think" it succeeded in modifying a protected file or resource, and showing it the resource as if it were modified, but in reality this resource remains unchanged.

According to one embodiment of the inventive virtualization, a name redirection method is utilized. To understand this embodiment, its operation will be described using an example of a program, PROGRAM.EXE, attempting to modify, overwrite, or create a file C:\ORIGINALDI—RECTORY\DOC.TXT, in a case where the program should not be given access. Using the name redirection method, the process proceeds as follows. A copy of the file, DOC.TXT is created on the memory system, e.g., hard drive, in a specially created directory, e.g., C:\Virtualization\PROGRAM.EXE\DOC.TXT. The program's pending I/O operation is then provided to the operating system, but is modified to include the new directory, i.e., C:\Virtualization\PROGRAM.EXE\DOC.TXT, rather than the original directory C:\ORIGINALDIRECTORY\DOC.TXT. Consequently, the operating system will perform the requested operation on the copy of the original file and will not modify the original file. Since this operation is done at the operating system kernel level, it is fully transparent to the program requesting the operation. Therefore, the requesting program has no way of knowing that the operation was performed on a copy of the file and not on the original file. In this manner, if the program has attempted to perform a malicious action on the file, it performed it only on a copy of the file and the original file remained unharmed.

Similarly, if the untrusted program attempts to read a file, e.g., C:\ORIGINALDIRECTORY\DOC.TXT, which may be a trusted file, according to the inventive method the virtualization directory is first checked to see whether such a file, i.e. DOC.TXT, exists in the virtualization directory, i.e., C:\Virtualization\PROGRAM.EXE\DOC.TXT. If such a file exists, the read request is modified to indicate the path to the file in the virtualization directory and provide the request to the operating system. Consequently, the program reads the virtualized file and not the original file and, any modification previously attempted on the original file but actually performed on the virtualized file, are present in the read file and can be viewed by the untrusted program. On the other hand, if the file does not exists in the virtualized directory, the OS envelope sends the request to the OS to read the original file. If no original file exists, the operation fails.

When an untrusted program requests a deletion of a file, the system check to see whether such a file exists in the virtualization directory. If so, it allows deleting of the virtualized file by modifying the request to indicate deletion of the virtualized file in the virtualized directory, and the request is provided to the OS for execution. Consequently, the virtualized file will be deleted. On the other hand, if the file does not exist in the virtualized directory, then the system simulates its deletion. According to one example for simulating a deletion of a file, the system "flags" the file for itself as being erased (for example: by listing it in an internal "erased files database", or by adding some flags/attributes/streams to it). The file is not really erased; however, when enumeration request is intercepted by the OS envelope, or when the program tries to access this file in the future, the system queries this "erased files database", and if the file exists there, the system returns a "Not found" error, as if the file is not there. The request information is stored in a database or in the virtual directory.

When an untrusted program requests a renaming of a file, the request information is stored in a database or in the virtualized directory, and the operation of creating a virtual file as explained above in [0104] is performed using the new file name.

When an untrusted program performs a call to the operating system to enumerate all files in a directory, i.e., a listing of the directory, the inventive method intercepts the call and returns a reply which enumerates the combination of the real directory listing, plus the virtual directory listing, less original files for which the program has previously requested deletion or renaming. In this manner, an enumeration call cannot be used to identify that the original files are being virtualized.

According to another embodiment of the virtualization, I/O requests to the operating systems are intercepted and performed by the OS envelope into its own database, rather than by the operating system. For example, when the OS envelope intercepts a write operation from an untrusted program, it does not send it to the operating system, but rather it writes the file in its own database. Then, when the untrusted program sends a read request for that file, the OS envelope again intercepts this request, reads the file from its own database, and sends the file to the untrusted program. In this manner, the operating system is not performing any operations for an untrusted program.

According to another embodiment of the invention, a method is provided to ensure that an untrusted program that has been changed to a trusted program still operates as a valid program. According to this embodiment, when a user acts to change a designation of an untrusted program into a trusted program, a check point is first made. The check point is basically an image of the system at the time the request was made. Then the request is performed and the program is now allowed to run as a trusted program. However, the activities of the program are monitored for any suspicious behavior. For example, if the program tries to modify an unrelated file, that would be detected as a suspicious activity. If such a suspicious activity is detected, the user is notified of the activity and is provided with options to proceed. For example, the user may stop the operation and close the program. The user may also elect to stop the operation and restore the system using the check point. That is, the computer will be restored to its configuration using the image of the system at the time the check point was made. The user may also elect to notify a system administrator and seek the administrator's advice. In this case, a notification is sent to an administrator operating server 800. The administrator may investigate the activity of the program and may make a decision to be sent back to the user.

Figure 10:
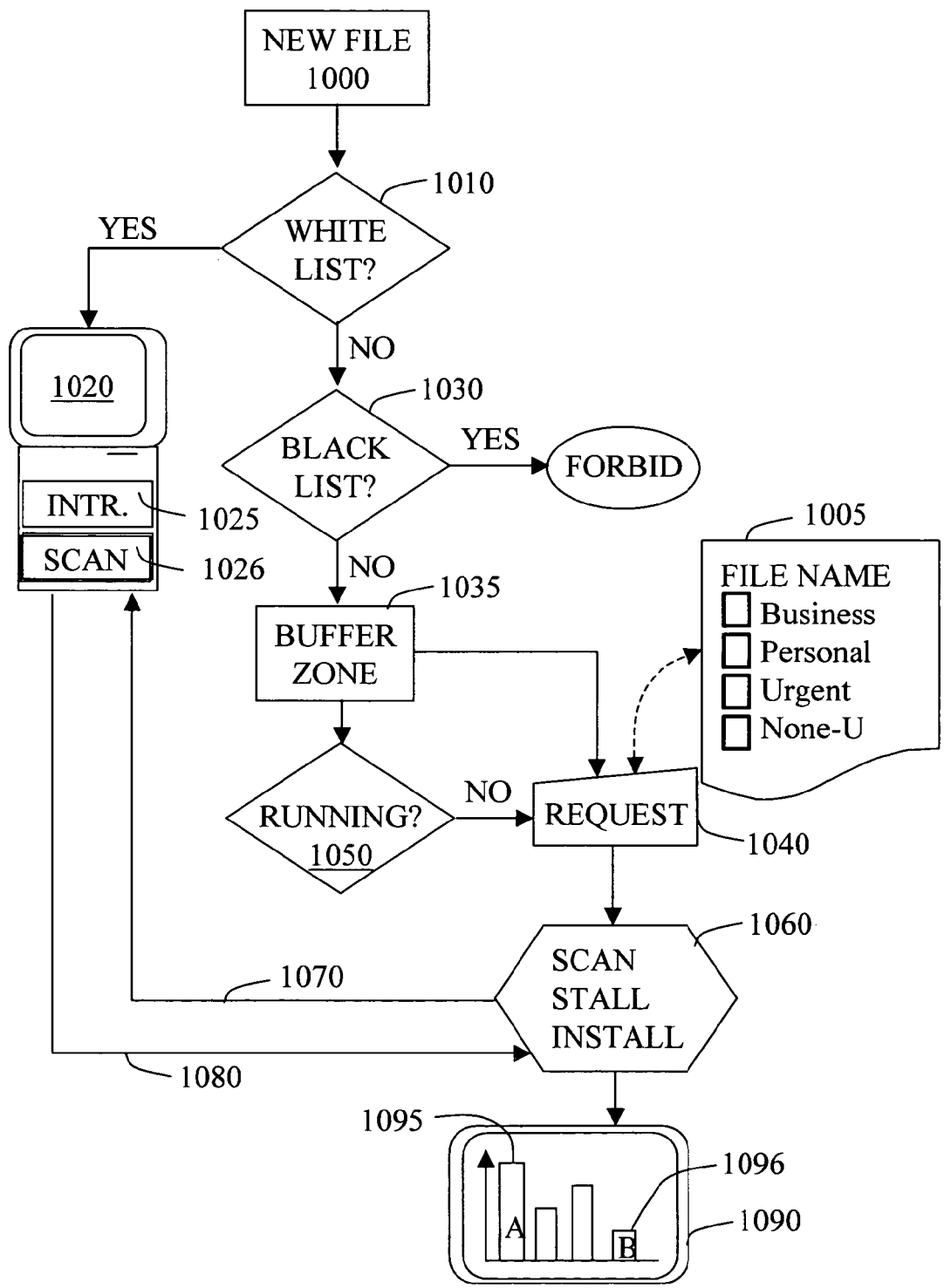
FIG. 10 depicts an embodiment of the present invention, which is beneficial for use in system depicted in FIG. 8.

FIG. 10 depicts an embodiment of the present invention, which is beneficial for use in the system depicted in FIG. 8. That is, the embodiment of FIG. 10 can be advantageously used in conjunction with a client server 800 having user computers, User PC 830-850, connected to it via a network. The embodiment of FIG. 10 assumes that each of the users computers is installed with an OS envelope, similar to the OS envelope described above. The client server is equipped with appropriate programs to enable the processes described herein-below. The OS envelope and the client server communicate with each other over the network 820.

When a new file 1000 is intercepted by the OS envelope, the OS envelope check to see whether the file is listed on the white list (Step 1010). The White list is a list of programs and files that have been designated as trusted. If the file is listed on the white list, the OS envelope allows the file to be installed on the computer 1020 in a trusted mode. That is, the file may perform anything it needs on the computer and interact with the OS and the network 820. It may also communicate with and change other trusted files and folders. If, on the other hand, the file is not listed on the white list, the OS envelope checks to see whether the file is listed on the black list (Step 1030). The black list is a list of programs and files that have been designated as forbidden. If the file is listed on the black list, the OS envelope does not allow the file to be saved and to access files, on the computer 1020.

If, on the other hand, the file is not on the white list or the black list, the file is designated as untrusted and is placed in a buffer zone 1035. The buffer zone 1035 is basically an environment wherein the file may use the computer's resources, but is not allowed to change any file or folder designated as trusted, and is not allowed to access the network 820. According to one embodiment, this is implemented as a virtualization according to the virtualization method described above. At this point, the user is provided with an option to send a request 1040 to the client server. If the user elects not to send the request, the file is allowed to operate in the buffer zone; however, if the file fails to run properly (Step 1050), the user is again provided with the option of sending a request 1040.

When a user sends a request 1040 to the client server, the file itself or information about the file is uploaded to the client server over the network. The client server may then perform one or any of the processes: scan, stall, and install (Step 1060). The process of scan is basically running one or more detection programs to inspect whether the file is or contains a virus, worm, Trojan, etc. These can be publicly available programs, such as McAfee, Norton, etc. As can be understood, the advantage of having the inventive system is that only one copy of each scan program needs to be acquired and installed on the client server; thereby avoiding the need to purchase a copy for installation on each of the users' computers. In addition to the economic advantage of needing only a single copy, the inventive arrangement is also more secure. That is, as is known, each of the scanner software needs to be periodically updated. However, many users fail to timely update their version of the scanner. Consequently, the scanner may fail to detect a hostile code that was created after the last update by the user. On the other hands, by having a single copy maintained by a technician at the client server, it is ensured that the latest updates are properly and timely made to provide maximum security.

If after the scan, or by other means, it has been determined that the program can be installed and run on the user's computer, the client server upload a version of the file to the user's computer, Step 1070, and adds it to the white list, i.e., enabling it to run in a trusted mode. However, although the file is allowed to run in a trusted mode, it is still monitored and its characteristics and resource usage is reported to the client server, Step 1080. Such a reporting is done from all of the users' computers and for any programs chosen by the client server. The client server displays the reporting on screen 1090 for the technician's monitoring. According to one method of the invention, the reporting is generally in the form of a graph, wherein the Y-axis represents the resource usage or risk usage of the program; while on the X-axis the various monitored programs are represented. Thus, for example, bar 1095 represent a high resource usage or high risk presented by program A, while bar 1096 represent low resource usage or low risk by program B. The technician then may click on any of the bars, whereupon the client server will display the names of all of the computers using this program. If the technician determines that the program presents a high risk to the users computers, the client servers may remove the program from the white list and may disable the program or have it run in an untrusted mode. In this manner, the client server helps monitor the users computers for malicious code that the user may not be able to detect independently.

It is generally known that malicious code attacks can be detected and publicized within about 24-48 hours of the first attack. Until then, such new malicious code can infiltrate even computes equipped with the most up to date scanners, since no detection code has been develop for this new malicious code. Therefore, according to a feature of the invention, when a request is received by the client server, one available option is stall. According to this option, the client server may send a notice to the requesting user that the program can be made available only after a given period of time has laps, e.g., 48 hours. The client server then "parks" the new file for the given period to see whether during this parking period the file will show up as a newly discovered malicious code. After the parking period the client server may scan the file with a newly updated scanner to see whether the file contains a newly discovered malicious code. If so, the client server will disallow this file from running on the users computer and, if not, the client server may allow the file to run on the computer. Another method to combat first day malicious code attacks can be dynamic 'parking' period. Where as it is known that first day malicious code outbursts are identified within a few hours. Therefore all requests can be 'parked' for, e.g., 3 hours, ensuring that there is no known outbreak. After 3 hours those 'parked' requests can be release. If however an outburst is identified over the network then the system automatically curfews all parked requests until a signature is release and only after all parked requests are analyzed against the new signatures the curfew is removed.

If the client server is connected to several users computers and it has determine that a file requested by one of the users computers may be allowed to run, the client server may: 1. allow the file to run on the requesting computer, e.g., by adding the file to the white list and uploading the file to the requesting computer; 2. allow the file to run on the requesting computer and any future requesting computer by adding the file to all of the users computers white list and uploading the program from the server to the originally requesting computer and to any future requesting computer; or 3. allow the file to run on all computers by adding the file to all of the users computers white list and uploading the file to all of the users computers. As can be appreciated, using method 2 provides an added security. First, every time a user computer requests to use the file, the client server provides a "clean" version of the file from the client server, and does not allow the use of a version from other sources, as such version may have become "contaminated" with malicious code in the meantime. Secondly, if at a later time it has been determined that the file contains malicious code or should be removed, then it is necessary to remove it only from the requesting computers. Incidentally, the same procedure may be followed when the client server determines that a file may be installed, per Paragraph 0110.

Another feature of the embodiment of FIG. 10 related to the request 1040. As illustrated by element 1005 in FIG. 10, when the user decides to send a request 1040, the user is provided with a form in which the user may indicate: the file's name, whether the file is needed for business or personal use, whether the file is needed urgently or not urgently, and any other comments the user may wish to enter. When the client server is set for this particular environment, e.g., for a particular company having users computers 830-850, certain rules can be coded into the client server. For example, one rule may be whether a folder for personal use may or may not be allowed to be installed on any of the users computers. Another rule may be, for example, that any file for personal use must be stalled, while any urgent file for business use cannot be stalled. In this manner, when a request is arrived at the client server, it may be handled automatically without the intervention of a technician.

Another feature of the invention relates to the programs that may run on the users computers 830-850. According to this feature, each or a selected ones of users computers is equipped with one or both of an intrusion detection program 1025 and a scanner 1026. The intrusion detection program 1025 continuously monitors operation of selected programs and sends the findings to the client server 800 for monitoring and handling, as discussed above with respect to, for example, element 1090. The scanner 1026 is any commercially available malicious code scanner. The scanner 1026 is kept updated by the client server 800, and it sends any detection information to the client server 800 for monitoring and handling.

Figure 11:
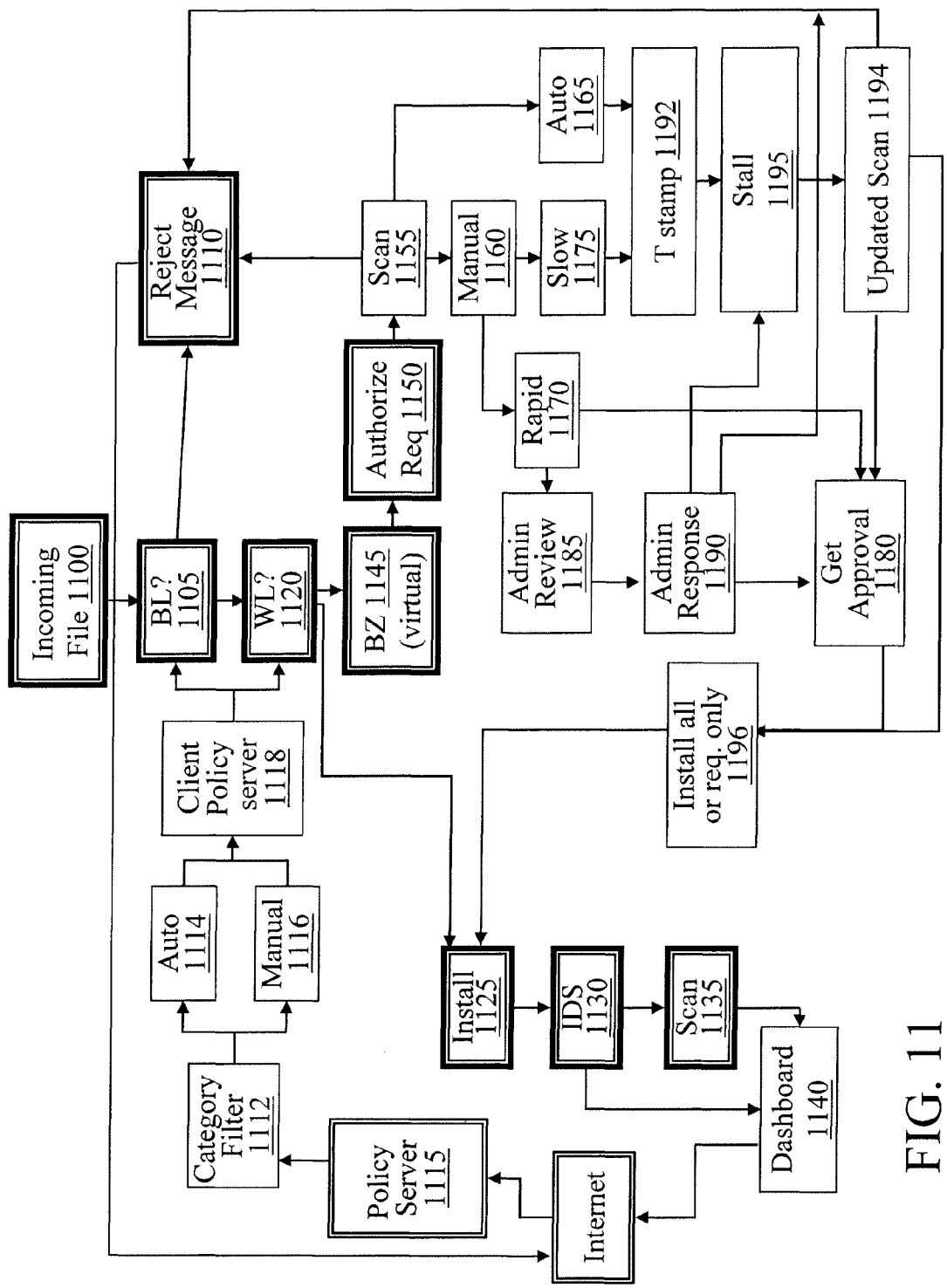
FIG. 11 illustrates another embodiment of the invention.

Another embodiment of the invention is depicted in FIG. 11. In FIG. 11, elements noted in a box having double thick/thin border lines are performed by the inventive user client software—referred to herein as the user computer; elements noted in a box having double-even border lines are performed by a policy server; and elements indicated in a box having a single border line are performed by a client server. In one illustrative implementation, an organization would have several computers running the client software and monitored by the client server, which also resides within the organization. The client server communicates with the policy server over a network, such as the internet. The policy server may communicate with other client servers of other organizations.

When a new file 1100 is loaded onto a user computer, the computer checks to see whether the file is listed on the black list, 1105, i.e., a list of forbidden programs. If the file is listed on the black list, a reject message, 1110, is issued and the file is forbidden from the computer. Optionally, a message is also sent to the policy server, 1115, so that the policy server may be updated to include a policy regarding this file. If the file 1100 is not on the black list 1105, then the computer checks whether the file is listed on a white list, 1120, i.e., a list of approved files. If the file 1100 is listed on the white list, then the file is allowed to be installed, 1125. As the file is running on the computer, an intrusion detection system, IDS 1130, and a virus scanner 1135, continuously run on the computer and sends relevant information to the dashboard 1140. The dashboard, 1140, enables a technician to monitor the computers running under the client server's supervision and to protect those computers from unwanted actions. Additionally, the dashboard 1140 may send relevant information to the policy server 1115 to enable the third party server to update its policy rules.

If the file 1100 is not listed on the white list, 1120, then the file is placed in a buffer zone 1145, which may be implemented as a virtualization system described above. As noted above in describing a buffer zone and a virtualization system, the file is allowed to execute a limited space of operations. For example, the file may not be allowed to modify any trusted files and may also be prevented from accessing the internet.

At any time, an authorization request 1150 may be sent from the computer to the system server, requesting an authorization to allow the file to run as a trusted file with full privileges on the user computer. When such a request is received, the system server performs a scan, 1155, to check whether the file contains any malicious or harmful code. If it does, a reject message, 1110, is issued and the request is refused. If the scan determines that the file is safe, the system may proceed either manually, 1160, or automatically, 1165. Whether the system proceeds manually or automatically may depend on the system's design, the available resources, and/or the data the user includes in the authorization request.

If the system proceeds manually, a determination can be made whether the response can slow 1175 or needs to be rapid 1170. For example, if the authorization request includes an indication that the file is needed for business purpose and is needed immediately, a rapid response, 1170, may be processed. On the other hand, if the installation is for personal use, the request may be processed under slow 1160. One option under the rapid response 1170 may be to approve the installation, 1180. Another option is to send the request to a system administrator for a review, 1185. The system administrator's response, 1190, may be a refusal, 1110, an approval, 1180, or a stall, 1195.

Under either a slow 1175 or auto 1165 process, the system may proceed as follows. A time stamp is generated to indicate the time that the request was made. Then the request is stalled 1195, i.e., the request is parked for a preset or variable time period. After the time period has elapse, an updated scan, 1194, is performed. As can be understood, this time the scanner may be updated and may include indicators for new malicious code that was discovered during the time the request was parked. If the file has not successfully passed the updated scan, the request is rejected. If the file has successfully passed the updated scan then an approval is provided.

In all cases where the request is approved, a decision, 1196, may be made whether the file should be installed in the requesting computer only or on all served computers, When a decision is made to install on all computer, the decision may be carried out by either actually installing the file on all of the served computers or by simply adding the identity of the file to the white list of all of the served computers, so that whenever one of the served computers attempts to install the file, the operation would be successful as the file will be identified as a trusted file.

One method of updating the black and white lists of the served computers can be installed as follows. When a new decision is made at the policy server 1115 to update the black list, white list or both, an indication is sent to the client server, which may first run the message through a category filter 1112. The category filter can organize the files under categories such as, for example, audio, video, pier-to-pier, etc. The categories may be per-programmed by the vendor, or may be modifiable by the user of the client server. From there the process may proceed automatically 1114 or manually 1116. Using manual operation, 1116, a professional Information Technology technician can approve, disapprove, or modify the indicated changes to the black and white lists. The indicated changes may also be passed through a client policy server. The client policy server may have different criteria for deciding on black and white listing, to enable a specific client company to reflect its business policies in the policy server criteria. For example, a particular company may have a policy that no computer games should be allowed to be run on the company's computers. This company policy may be reflected in the client policy server 1118 so that even if a file of a computer game is approved by the policy server 1115 to be place on the white list as being trusted and free of malicious code, the client policy server 1118 may nevertheless place that file under the black list to prevent its installation.

A particular implementation of the virtualization feature of the invention will now be described with reference to various examples. In these examples, it is assumed that the system is running in a virtualized mode.

In this embodiment, a virtual directory is composed using the path:
Path A: C:\Virtual\[vid]\[drive]_[file_path]

In Path A, [vid] is a VirtualID returned by the high-level algorithms. It is an arbitrary string that can be anything, for example, the unique identifier of the virtual environment in which the process is running The [drive] is the drive identifier, where colon, ":", is replaced by underscore, "_". For example, drive identifier "C:" is converted to "C_". The [file_path] is the rest of the path. For example "\WINNT\SYSTEM32\TOTO.ABC". To demonstrate, in order to virtualize Path B:
Path B: C:\WINNT\SYSTEM32\TOTO.TXT
the I/O operation is redirected to:
Path C:
   C:\Virtual\VID\C_\WINNT\SYSTEM32\TOTO.TXT Of course, more than one virtual directory can be created, e.g., VID1, VID2, etc. In this manner, it is possible to run different programs, each in its own environment without the ability to contaminate the computer. A feature of the subject invention is that by simply deleting the virtual directory one is able to return the computer to its original condition regardless of what program was running and what objects were created in the virtual directory.

During virtualized operation it is imperative to keep track of existing, created and deleted files in the real and virtualized directories. Therefore, when an inquiry regarding a file is received, i.e., VirtualFS_FileExists, the system returns TRUE if the file exists in the virtual directory or if both of these conditions apply: the file exists in the real directory and there is no such file with an extension ".$deleted" in the virtual directory. The ".$deleted" extension indicates that a previous virtualized delete operation has been performed, as explained more fully below.

Various operations in the virtualized mode requires the system to comy a file from the real directory to the virtualized directory. The copy operation, VirtualFS_CopyRealToVirtual, is implemented by performing the steps: i. recreate each sub-directory; ii. for each sub-directory created, copy the NTFS rights and flags of the directory (Owner, etc); and iii. copy the file itself, along with its rights (Owner, etc). For example, to virtualize "C:\WINNT\SYSTEM32\Toto.txt", recreate first "C:\Virtual\VID\C_" if it doesn't exist, then "C:\Virtual\VID\C_\WINNT", then "C:\Virtual\VID\C_\WINNT\SYSTEM32" and then copy the file itself "C:\Virtual\VID\C_\WINNT\SYSTEM32\Toto.txt".

As noted above, during virtualization, various operations are implemented by system call interception of File I/O requests. Such operations are, e.g., read, write, delete, rename, create, and enumerate. These operations are exemplified as follows.

VirtualizeFsRead:
   Check if file exists in the virtual directory.
   If it does, redirect the file name of the I/O operation to the virtual directory.
   If it doesn't, leave the call unchanged.

VirtualizeFsWrite:
   Check if file exists in the virtual directory.
   If it does, redirect the file name of the I/O operation to the virtual directory.
   If it doesn't, perform VirtualFS_CopyRealToVirtual on the real file into the virtual directory, and modify the file name of the I/O operation to that of the virtual directory.

VirtualizeFsDelete:
   If VirtualFS_FileExists(file)==FALSE, return FILE_NOT_FOUND. This is necessary because of the check of special extension ".$deleted"! That is, a check is first made to see whether a request to delete this file was already executed. That is, if a check whether the file exists finds that the only file with that name has a ".$delete" extension, it means that this file doesn't exists anymore, as a virtualized delete request has already been executed.
   If file exists in the real directory only, create an empty file in the virtual directory, bearing the same name+extension ".$deleted". Return SUCCESS without forwarding the call to the OS.
   If file exists in the virtual directory only, erase it.
   If file exists in both the virtual and the real directories, perform the two above actions (but returning SUCCESS only if both operations succeeded). Note that just deleting the file from the virtual directory is insufficient because if we just delete the virtual file from the virtual directory, then next time there's a listing requests, the virtualization program will not know to hide the corresponding file in the real directory and it will show it to the requesting program. Therefore, we must create a ".$delete" indication in the virtual directory to prevent showing the real file.

VirtualizeFsRename (SourceFile, TargetFile):
　If VirtualFS_FileExists(SourceFile)==FALSE, return error: FILE_NOT_FOUND.
　If VirtualFS_FileExists(TargetFile)=TRUE, return error: (same error RENAME returns in this case, e.g., "file (TargetFile) already exists. Do you want to replace (TargetFile) created mm/dd/yy with this (TargetFile)?)
　If source file exists only in the virtual directory:
　　Rename the file in the virtual directory, i.e., copy it but name it with the new target name.
　If the source file exists only in the real directory:
　　VirtualFS_CopyRealToVirtual(Real Source File→Virtual Destination File)
　　Call VirtualizeFsDelete(SourceFile) so that the real source file won't be visible in the virtual directory's listing anymore.
　If source file exists in the virtual and real directories:
　　Rename the file in the virtual directory.
　　Call VirtualizeFsDelete(SourceFile) so that the real source file won't be visible in the virtual directory's listing anymore.
VirtualizeFsCreate:
　If file does not exist in the virtual nor the real directory:
　　Redirect the file's name into the virtual directory, i.e., the file is created in the virtual directory only.
　In all cases, if the OS operation is successful, delete the file with the same name+".$deleted", if it exists in the virtual directory.
VirtualFsEnum:
　Return a listing made of the two directories: listing of the real directory and listing of the virtual directory.
　For each file:
　　If the same file exists in the virtual and the real directories, it is the virtual file that needs to be displayed.
　　During the listing, avoid displaying ".$deleted" files, as well as the files that they accompany (i.e: if NOTEPAD.EXE.$deleted exists, avoid displaying NOTEPAD.EXE and NOTEPAD.EXE.$deleted).
　　On the other hand, if in the virtual directory there is a file FILE.EXE.$deleted and a file FILE.EXE, the virtual file FILE.EXE is still displayed. In other words, the ".$deleted" only applies to files that exist in the real directory. But it does not influence the listing of files from the virtual directory.

EXAMPLE 1

If the Real directory contains:
　REAL1.EXE
　REAL2.EXE
　REAL3.EXE
And the Virtual directory contains:
　VIRTUAL1.EXE
　VIRTUAL2.EXE
　REAL2.EXE. $DELETED
Then the Virtualized listing should be:
　REAL1.EXE
　REAL3.EXE
　VIRTUAL1.EXE
　VIRTUAL2.EXE
(REAL2.EXE disappeared).

EXAMPLE 2

If the Real directory contains:
　FILE1.EXE (10 bytes)
　FILE2.EXE (20 bytes)
　FILE3.EXE (30 bytes)
And the Virtual directory contains:
　FILE1.EXE.$DELETED
　FILE1.EXE (40 bytes)
　FILE2.EXE (50 bytes)
　TOTO.EXE (60 bytes)
Then the Virtualized listing should be:
　FILE1.EXE (40 bytes)
　FILE2.EXE (50 bytes)
　FILE3.EXE (30 bytes)
　TOTO.EXE (60 bytes)

The invention is described herein with reference to particular embodiments thereof which are exemplified in the drawings. It should be understood, however, that the various embodiments depicted in the drawings are for illustration only and may not limit the invention as defined in the appended claims. Additionally, while the invention has been described with reference to particular embodiments thereof, it is not limited to those embodiments. Specifically, various variations and modifications may be implemented by those of ordinary skill in the art without departing from the invention's spirit and scope, as defined by the appended claims.

The invention claimed is:

1. A computerized method of managing a computer's operation in a computer having a real directory, comprising:
　when it is determined that a program should not be run on an unlimited trusted mode, causing the computer to:
　create a virtual directory;
　when the program attempts to delete a named file, performing the operations:
　checking whether a delete operation on the named file has already been executed and, when so, returning a file not found indication;
　otherwise:
　when the named file exists in the real directory only, creating a deleted indicator and returning a success indication,
　when the named file exists in the virtual directory only, erasing the named file, and
　when the named file exists in both the real and virtual directories, creating a deleted indicator, erasing the named file from the virtual directory, and returning a success indication.

2. The computerized method of claim 1, further comprising causing the computer to:
　for each subsequent program that should not be allowed to run on the computer on an unlimited mode, create a subsequent virtual directory.

3. The computerized method of claim 2, further comprising causing the computer to delete at least one subsequent virtual directory to return the computer to its original condition.

4. The computerized method of claim 1, further comprising causing the computer to:
　intercept a disallowed operation request sent from the program to the computer's operating system;
　modify the operation request to obtain a modified operation request;
　perform one of: execute the modified operation request or provide the modified operation request to the operating system;
　send to the program an indication that the disallowed operation request has been performed as requested by the program.

5. The computerized method of claim 1, further comprising causing the computer to:
　intercept a disallowed operation request sent from the program to the computer's operating system; and, perform one of:
execute the operation request without providing it to the operating system; or,
modify the operation request and provide the modified operation request to the operating system;
send to the program an indication that the disallowed operation request has been performed as requested by the program.

6. The computerized method of claim 1, wherein when a success indication is returned, a delete call is not forwarded to the operating system.

7. The computerized method of claim 1, further comprising tracking existing, created and deleted files in a real directory and the virtual directory.

8. A computerized method of managing a computer's operation in a computer having a real directory, comprising:
when it is determined that a program should not be run on an unlimited trusted mode, causing the computer to:
create a virtual directory;
when the program attempts to rename a named file, performing the operations:
when the named file exists in the real directory only, copying the named file into the virtual directory, renaming the named file in the virtual directory, and generating a deleted indicator for the named file,
when the named file exists in the virtual directory only, renaming the named file, and
when the named file exists in both the real and virtual directories, renaming the named file in the virtual directory, generating a delete indicator for the named file, and returning a success indication.

9. The computerized method of claim 8, further comprising causing the computer to:
for each subsequent program that should not be allowed to run on the computer on an unlimited mode, create a subsequent virtual directory.

10. The computerized method of claim 9, further comprising causing the computer to delete at least one subsequent virtual directory to return the computer to its original condition.

11. The computerized method of claim 8, further comprising causing the computer to:
intercept a disallowed operation request sent from the program to the computer's operating system;
modify the operation request to obtain a modified operation request;
perform one of: execute the modified operation request or provide the modified operation request to the operating system;
send to the program an indication that the disallowed operation request has been performed as requested by the program.

12. The computerized method of claim 8, further comprising causing the computer to:
intercept a disallowed operation request sent from the program to the computer's operating system; and,
perform one of:
execute the operation request without providing it to the operating system; or,
modify the operation request and provide the modified operation request to the operating system;
send to the program an indication that the disallowed operation request has been performed as requested by the program.

13. The computerized method of claim 8, wherein copying the named file into the virtual directory is performed by:
copying each sub-directory;
copying rights and flags for each sub-directory; and,
copy the named file and its rights.

14. The computerized method of claim 8, further comprising tracking existing, created and deleted files in a real directory and the virtual directory.

* * * * *